United States Patent
Naymark et al.

(10) Patent No.: US 10,252,761 B2
(45) Date of Patent: Apr. 9, 2019

(54) TWO-WHEELED VEHICLE

(71) Applicant: Indian Motorcycle International, LLC, Medina, MN (US)

(72) Inventors: Cole D. Naymark, Denver, CO (US); David A. Swan, Forest Lake, MN (US); Richard J. Christoph, Victoria, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 145 days.

(21) Appl. No.: 14/808,823

(22) Filed: Jul. 24, 2015

(65) Prior Publication Data

US 2017/0021883 A1    Jan. 26, 2017

(51) Int. Cl.
  *B62J 1/08* (2006.01)
  *B62J 1/02* (2006.01)
  (Continued)

(52) U.S. Cl.
  CPC ............ *B62J 1/08* (2013.01); *B62J 1/00* (2013.01); *B62J 1/02* (2013.01); *B62J 1/12* (2013.01); *B62J 1/18* (2013.01); *B62J 1/002* (2013.01)

(58) Field of Classification Search
  CPC ......... B62J 1/00; B62J 1/02; B62J 1/04; B62J 1/08
  See application file for complete search history.

(56) References Cited

U.S. PATENT DOCUMENTS

| | | | |
|---|---|---|---|
| 1,469,136 A * | 9/1923 | Ziska, Jr. ................ | B62J 1/04 297/196 |
| 2,320,210 A * | 5/1943 | Bender .................... | B62J 1/14 297/203 |

(Continued)

FOREIGN PATENT DOCUMENTS

| | | |
|---|---|---|
| AU | 693070 | 6/1998 |
| DE | 202011051372 | 11/2011 |

(Continued)

OTHER PUBLICATIONS

Andrew Jones: '79 Yamaha SR500—Old Empire Motorcycles; Feb. 9, 2015, XP055310173, pipeburn.com, retrieved from the Internet: URL:http://www.pipeburn.com/home/2015/02/07/79-yamaha-sr500-old-empire-motorcycles.html; retrieved on Oct. 12, 2016.

(Continued)

*Primary Examiner* — Philip F Gabler
(74) *Attorney, Agent, or Firm* — Faegre Baker Daniels LLP

(57) ABSTRACT

In an exemplary embodiment of the present disclosure, a seat assembly for a motorcycle is provided. The seat assembly has a forward end and a rear end. The seat assembly including a seating surface; and a cantilevered seat support including a mount portion and a cantilevered portion, the cantilevered seat support providing for coupling to a frame of the motorcycle such that a rear end of the seat support is spaced apart from the frame and exclusively coupled to the frame via the mount portion at the forward end of the seat assembly, the cantilevered portion including a first length extending from the mount portion to the rear end. The seating surface is supported by the cantilevered seat support such that greater than 50% of the length of the cantilevered portion is obscured from view when viewed in a lateral plan view.

12 Claims, 12 Drawing Sheets

(51) Int. Cl.
  *B62J 1/18*   (2006.01)
  *B62J 1/00*   (2006.01)
  *B62J 1/12*   (2006.01)

(56) References Cited

U.S. PATENT DOCUMENTS

| | | | | |
|---|---|---|---|---|
| 2,497,121 | A * | 2/1950 | Fletcher | B62K 3/10 280/261 |
| 2,680,472 | A * | 6/1954 | Hempe, Jr. | B60N 2/502 248/565 |
| 2,880,034 | A * | 3/1959 | Kamlukin | B60N 2/40 180/12 |
| 4,103,858 | A * | 8/1978 | Swenson | B62J 1/02 248/421 |
| 5,382,038 | A * | 1/1995 | Allsop | B62J 1/04 188/378 |
| 7,059,672 | B2 * | 6/2006 | Saccucci | B62J 1/08 297/195.1 |
| 2004/0004375 | A1 * | 1/2004 | Garland | B62J 1/00 297/204 |
| 2012/0242122 | A1 | 9/2012 | Kawatani | |

FOREIGN PATENT DOCUMENTS

| | | |
|---|---|---|
| EP | 1964759 | 3/2008 |
| EP | 2316718 | 4/2011 |
| EP | 2371693 | 5/2011 |
| GB | 518753 | 6/1940 |

OTHER PUBLICATIONS

Anonymous: "BMW R90S by Sebastien Beaupere; Return of the Cafe Racers"; Apr. 18, 2013, XP055310195, retrieved from the Internet: URL:http://www.returnofthecaferacers.com/2013/04/bmw-r90s-by-sebastien-beaupere.html; retrieved on Oct. 12, 2016.

Anonymous: "1st Yamaha Motorcycle YA-1 1955"; Jan. 30, 2011, XP055310198, retrieved on the Internet: URL:http://yoshimichi.blogspot.nl/2011/01/1st-yamaha-motorcycle-ya-1-1955-copied.html; retrieved on Oct. 12, 2016.

International Search Report and Written Opinion; International Application No. PCT/US2016/042777; received on Oct. 24, 2016.

* cited by examiner

TWO-WHEELED VEHICLE

BACKGROUND OF THE INVENTION

The present disclosure relates to a two-wheeled vehicle and, more particularly, to a motorcycle having added rider comfort, simplified assembly, and a desirable appearance.

Conventional two-wheeled vehicles include a frame for supporting an operator. The frame may also support a passenger rearward of the driver. An engine is typically positioned below the driver and is coupled to the frame. The front of the vehicle may include a panel or cover positioned forwards of the driver for supporting additional components of the vehicle, for example a light. The rear of the vehicle may include a cargo area, for example saddle bags extending laterally outward from the frame.

SUMMARY OF THE INVENTION

In an exemplary embodiment of the present disclosure, a seat assembly for a motorcycle is provided. The seat assembly has a forward end and a rear end. The seat assembly including a seating surface; and a cantilevered seat support including a mount portion and a cantilevered portion, the cantilevered seat support providing for coupling to a frame of the motorcycle such that a rear end of the seat support is spaced apart from the frame and exclusively coupled to the frame via the mount portion at the forward end of the seat assembly, the cantilevered portion including a first length extending from the mount portion to the rear end. The seating surface is supported by the cantilevered seat support such that greater than 50% of the length of the cantilevered portion is obscured from view when viewed in a lateral plan view.

A further exemplary embodiment of the present disclosure includes a seat assembly coupled to a motorcycle frame, including: a seat support pan defining a first perimeter; a flexible member coupled to the seat support and having a second perimeter such that all portions of the first perimeter are within the second perimeter; and a seat surface coupled to the flexible member at the second perimeter.

In yet another embodiment of the present disclosure, a method of mounting a seating surface element to a support structure is provided including: obtaining the support structure, the support structure having a weight capacity to support a human seated thereon, the support structure having a first perimeter; obtaining a seating surface element including at least one of fabric and a skin, obtaining a flexible member having a second perimeter larger than the first perimeter, coupling the flexible member to the support structure such that the second perimeter encompasses the first perimeter; and coupling the seating surface element to the flexible member.

The above mentioned and other features, and the manner of attaining them, will become more apparent and will be better understood by reference to the following description of embodiments of the disclosure taken in conjunction with the accompanying drawings.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

Figure 1:
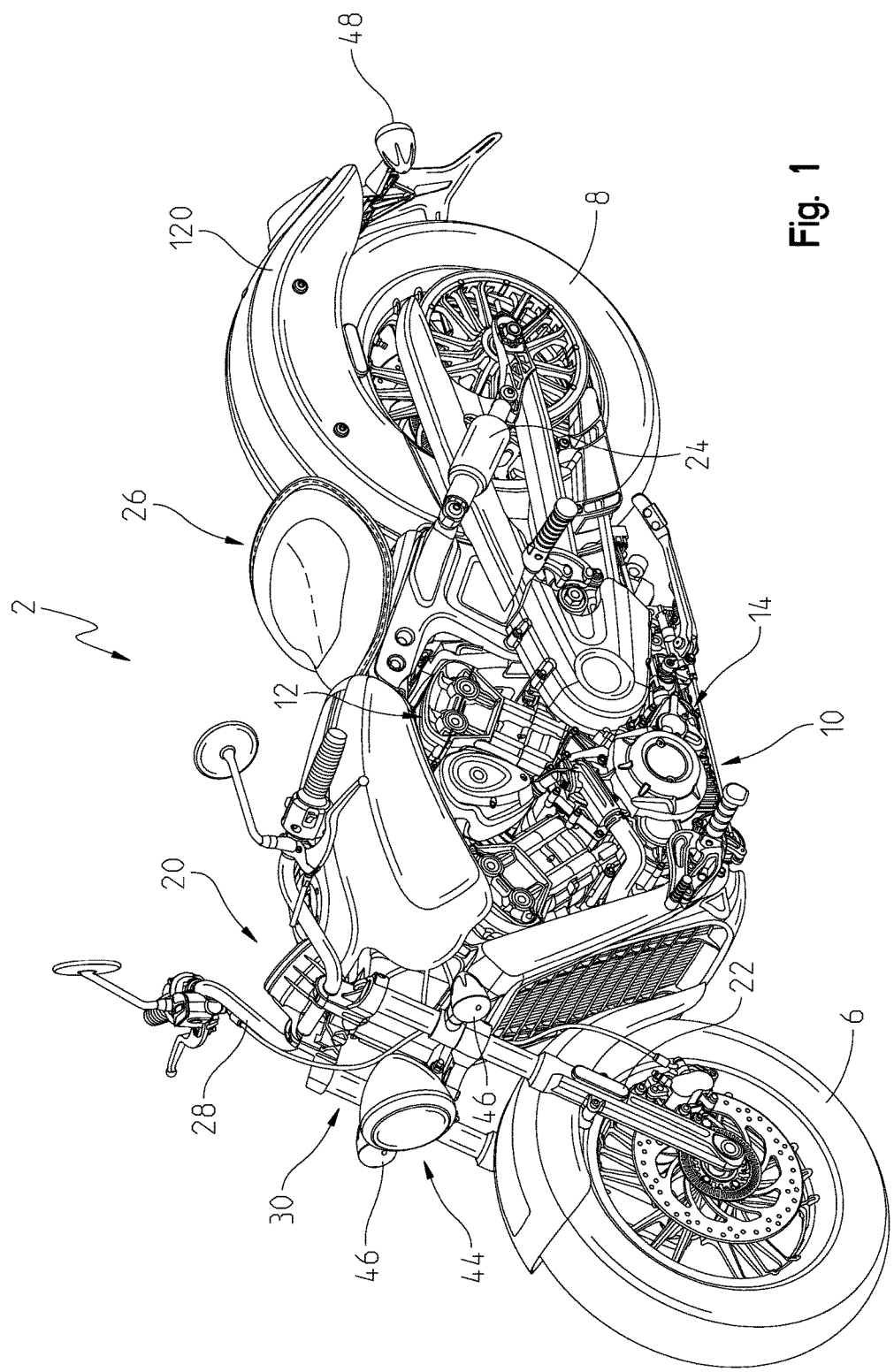
FIG. 1 is a left front perspective view of the two-wheeled vehicle.

The embodiments disclosed below are not intended to be exhaustive or to limit the invention to the precise forms disclosed in the following detailed description. Rather, the embodiments are chosen and described so that others skilled in the art may utilize their teachings. While the present disclosure primarily involves a cruiser motorcycle, it should be understood, that the concepts may have application to other types of vehicles such as all-terrain vehicles, motorcycles, watercraft, utility vehicles, scooters, golf carts, and mopeds.

With reference first to FIGS. 1-7, an illustrative embodiment of a two-wheeled vehicle 2 is shown. Vehicle 2 as illustrated is a touring style motorcycle although the majority of components may be used for a cruiser style motorcycle as described herein.

Vehicle 2 includes a frame 4 supported by ground engaging members, namely a front ground engaging member, illustratively wheel 6, and a rear ground engaging member, illustratively wheel 8. Vehicle 2 travels relative to the ground on front wheel 6 and rear wheel 8.

Rear wheel 8 is coupled to a power train assembly 10, to propel the vehicle 2 through rear wheel. Power train assembly 10 includes both an engine 12 and transmission 14. Transmission 14 is coupled to engine 12 which provides power to rear wheel 8. In certain embodiments, rear wheel 8 is coupled to a drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuously variable transmission (CVT).

It will be appreciated that while the vehicle 2 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Motorcycle 2 also generally includes a steering assembly 20, front suspension 22, rear suspension 24, and seat assembly 26. Steering assembly 20 includes handlebars 28 which may be moved by an operator to rotate front wheel 6 either to the left or the right, where steering assembly is coupled to the motorcycle through triple clamp assembly 30. Operator controls are also provided for operating and controlling vehicle 2, which may include vehicle starting system, vehicle speed controls and vehicle braking systems. Safety systems may also be provided such as main lighting 44, front turn signals 46, and rear turn signals 48.

Figure 2:
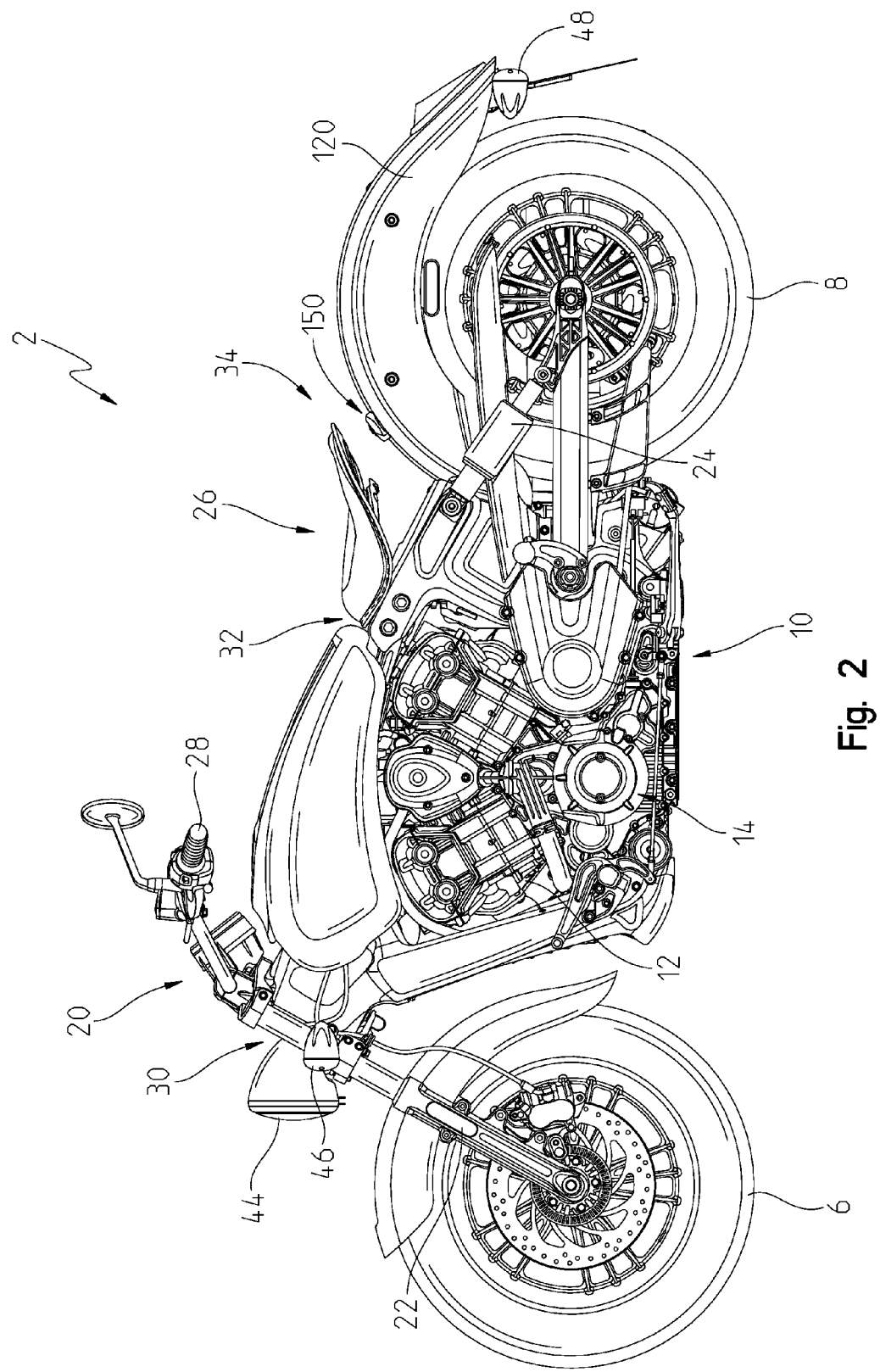
FIG. 2 is a left side view of the two-wheeled vehicle of FIG. 1.
Figure 3:
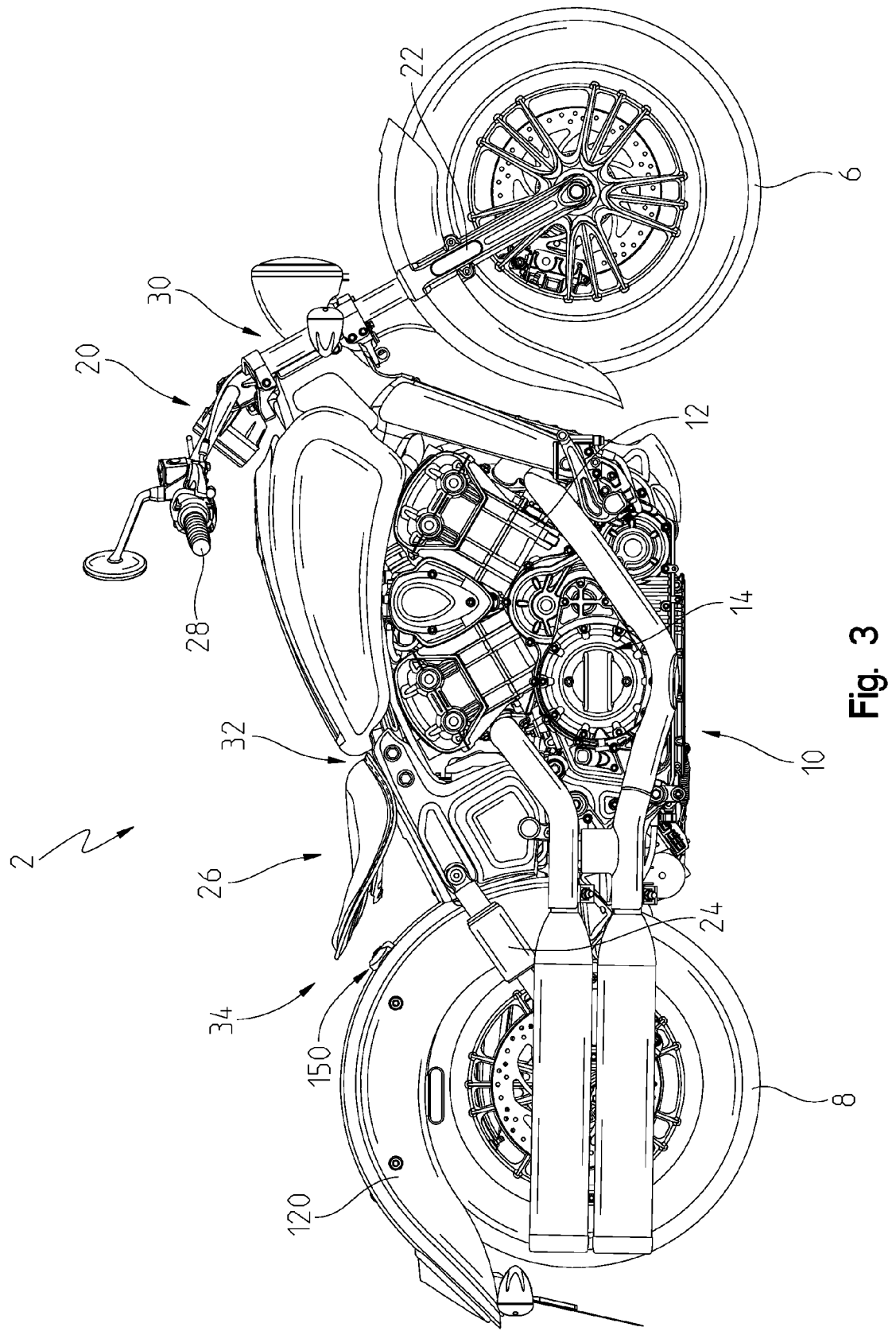
FIG. 3 is a right side view of the two-wheeled vehicle of FIG. 1.
Figure 4:
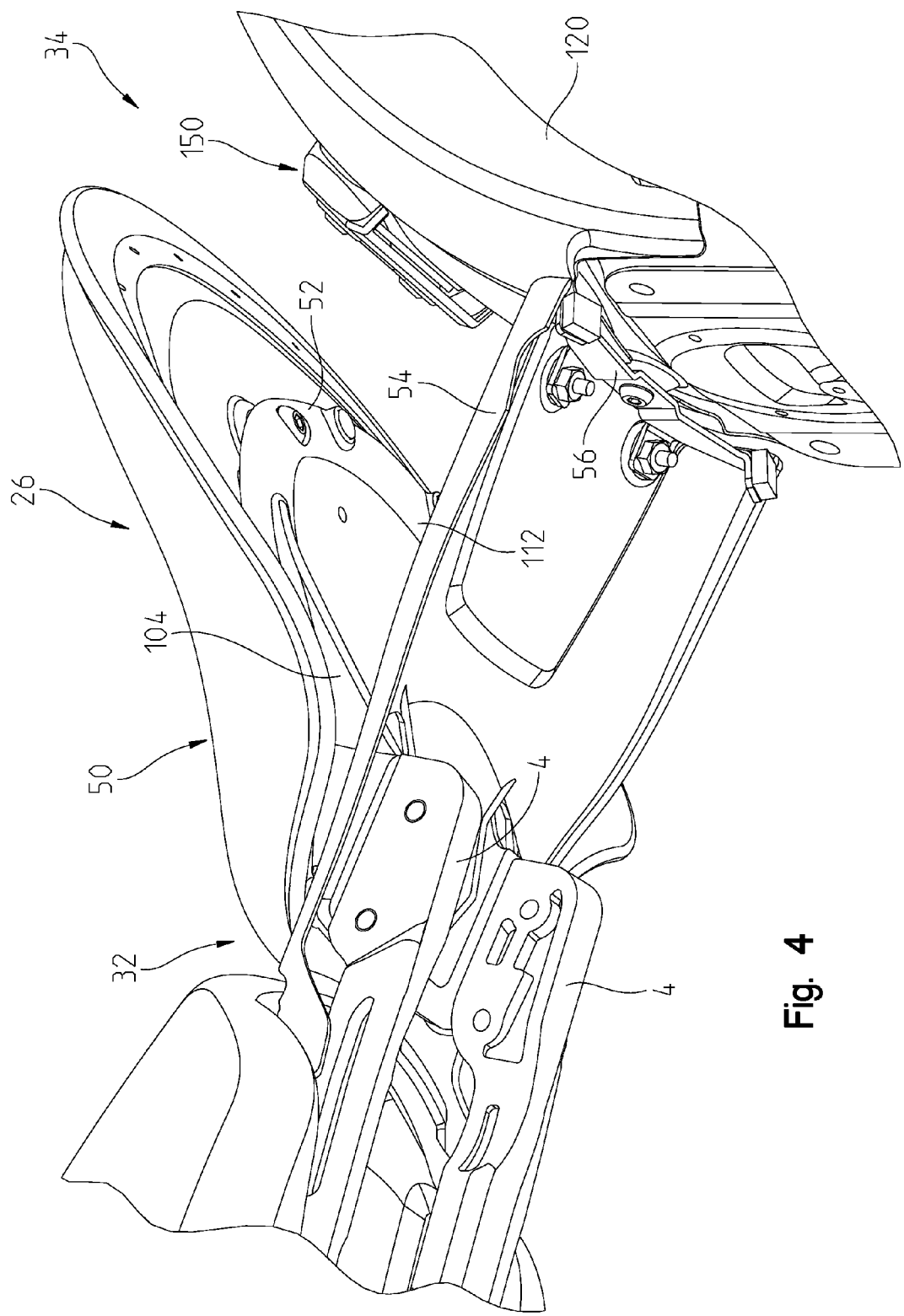
FIG. 4 is a lower perspective view of a seat and frame portions of the vehicle of FIG. 1.
Figure 5:
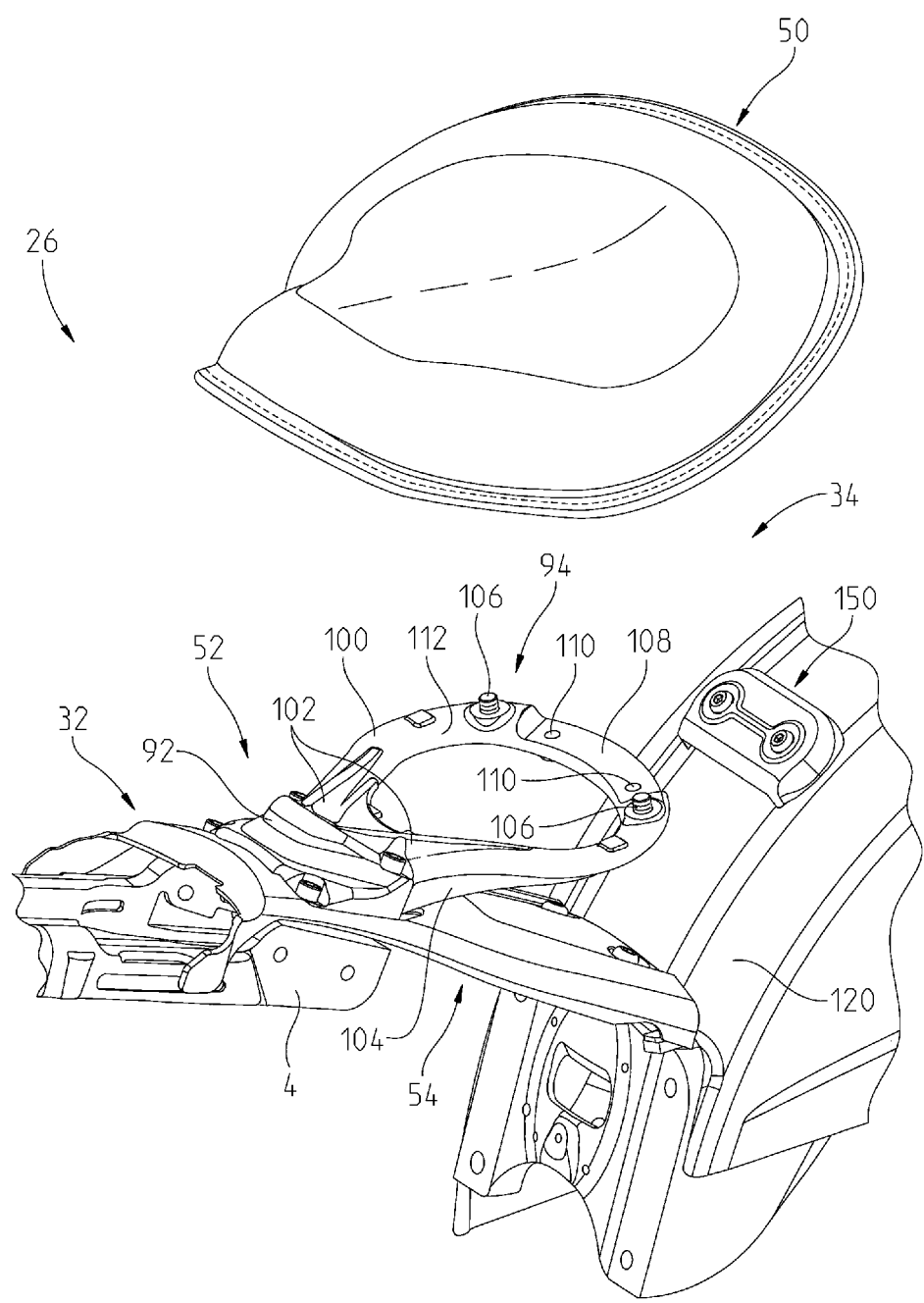
FIG. 5 is a top perspective view of the seat and frame of FIG. 4 with a seating surface removed from a support and frame portions of the vehicle of FIG. 4.

As shown most clearly in FIGS. 2 and 3, seat assembly 26 provides a cantilevered seat. Seat assembly 26 includes a connection to the frame at forward end 32 and is unconnected at rear end 34. Accordingly, seat assembly 26 gives the appearance of "floating."

Figure 12:
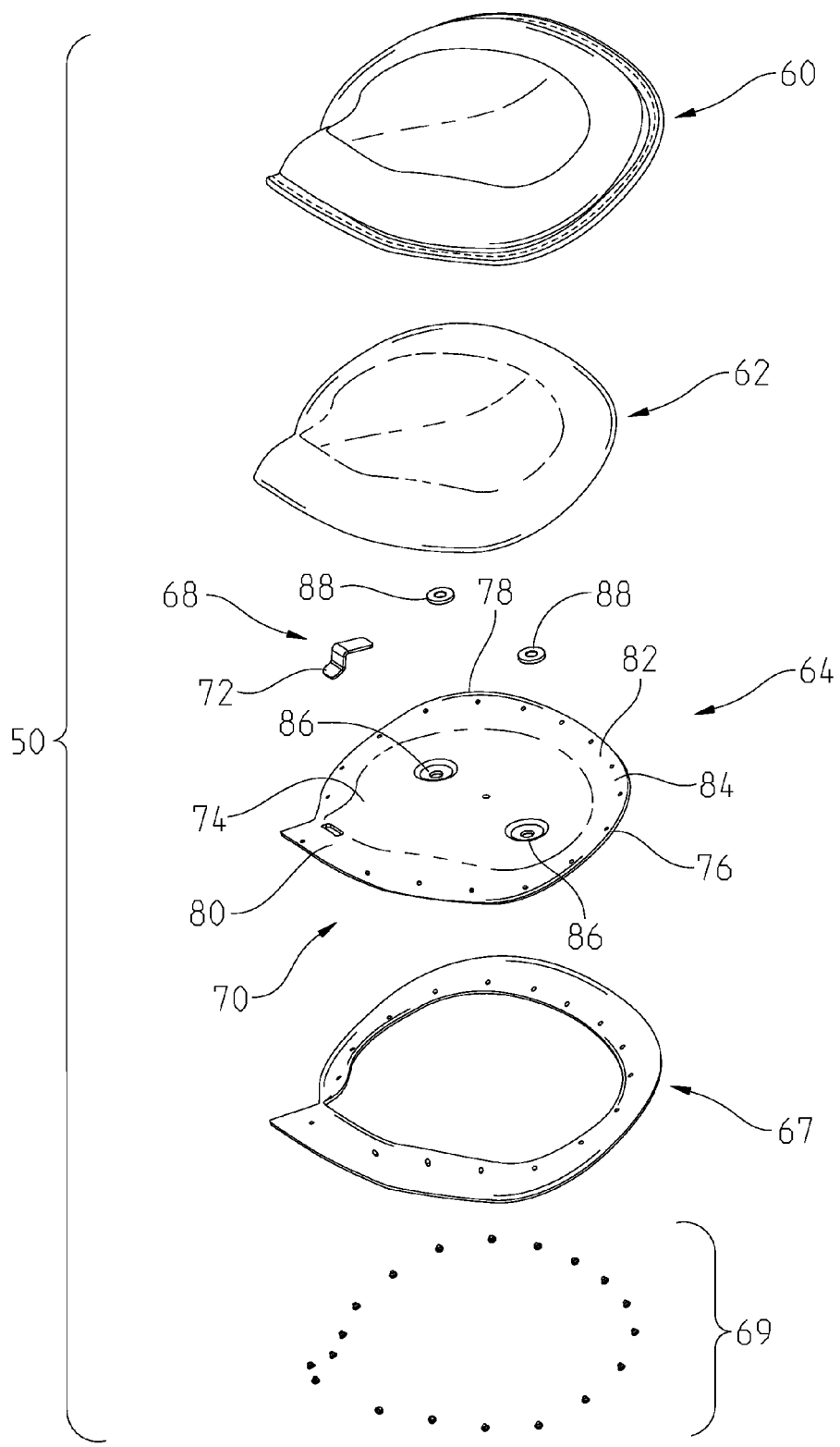
FIG. 12 is an exploded view of the seating assembly of FIG. 5.

Seat assembly 26 includes seating surface 50, seat mount 52, battery cover 54, cover mount 56, and various hardware (such as bolts, screws, washers, rivets, etc). Seating surface 50 includes seat cover 60, seat foam 62, seat pan 64, and flexible seat interface 67, FIG. 12. Seat cover 60 is illustratively constructed from leather. However embodiments are envisioned where seat cover is made from any number of other materials known to be suitable for providing seating surfaces. Seat cover 60 provides an upward facing surface that engages a user seated thereon. Seat foam 62 is sized to fit within seat cover 60 and provides cushioning between seat cover 60 and seat pan 64.

Seat pan 66 is illustratively constructed of metal (such as steel) and is designed to provide weight support for a rider seated thereon. Seat pan 66 is further provided to have minimal distortion when the rider is seated thereon. Seat pan 66 further includes tongue 68 located on a lower side thereof and located near a forward end 70 of seat pan 66. Tongue 68 includes a forward end 72 cantilevered off of seat pan 66. Seat pan 66 further includes a plurality of coupler voids 84 about its periphery and includes weld nut detents 86 disposed more centrally. Coupler voids 84 are illustratively sized to receive and retain rivets therein. Weld nut detents 86 are areas that are offset downward and sized to receive weld nuts 88 therein such that when weld nuts are therein, upper sides of the weld nuts do not significantly rise above the surrounding material of the seat pan. In this way, the presence of weld nuts 88 is less perceptible by a rider through seat cover 60 and seat foam 62. Weld nut detents 86 further define bolt holes therein sized and shaped to allow bolts (or other suitable connectors) to extend therethrough and engage weld nuts 88 as described below.

Flexible seat interface 67 is illustratively constructed from 199 RTP nylon. Interface 67 is illustratively a ring of material that has a contour (or is able to be shaped to have a contour) similar to the outer periphery of seat pan.

Figure 13:
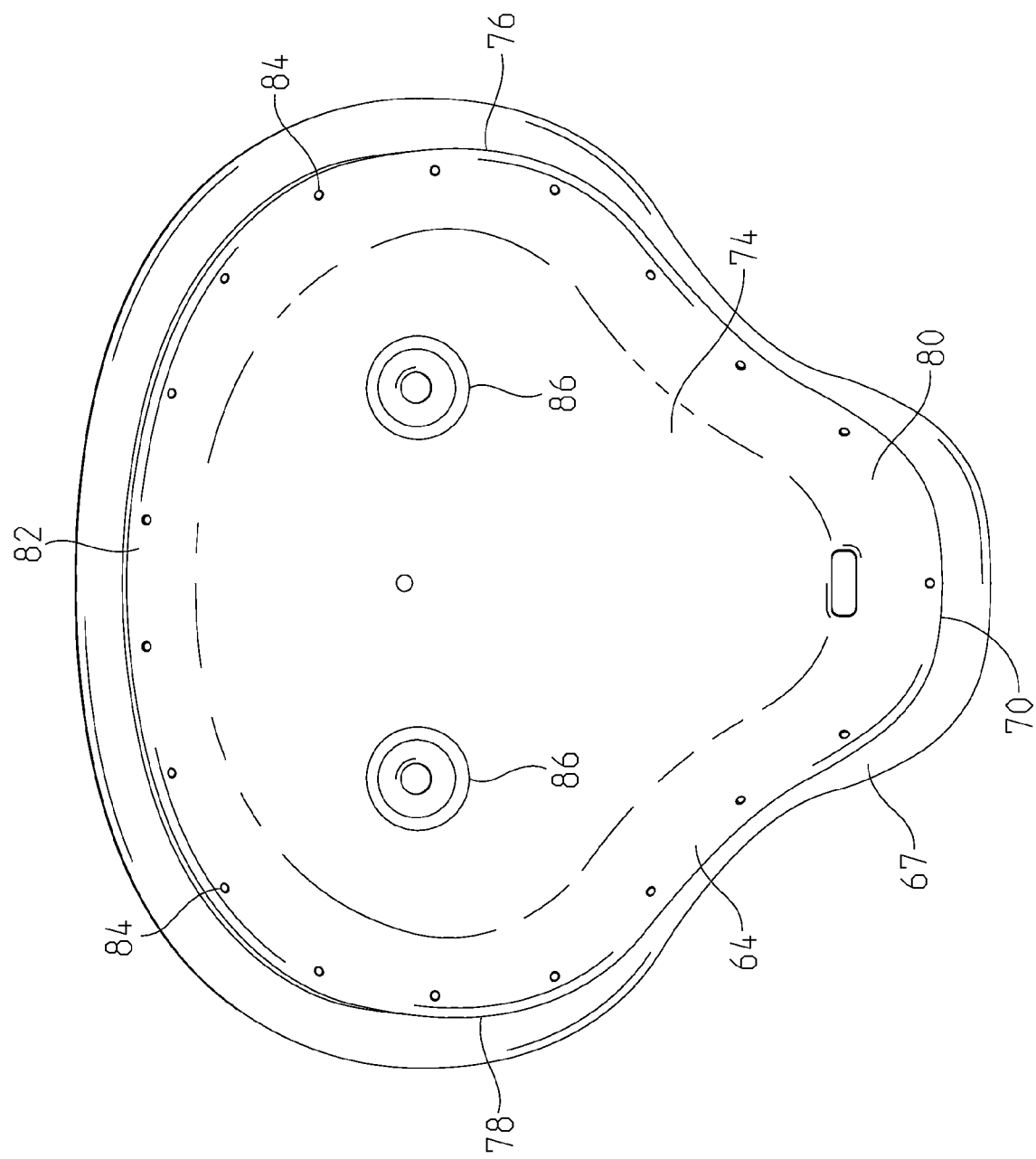
FIG. 13 is a top view of a portion of the seating assembly of FIG. 12.

In assembly, interface 67 is riveted (rivets 69) to the bottom of seat pan 66. Seat pan 66 includes a periphery/perimeter and interface 67 includes a different periphery/perimeter. The perimeter of seat pan 66 is smaller than the perimeter of flexible seat interface 67. Indeed, when riveted to the bottom of seat pan 66, FIG. 13, the perimeter of flexible seat interface 67 extends radially beyond all portions of the perimeter of seat pan 66. Thus, for the riveted combination of seat pan 66 and flexible seat interface 67, the perimeter of flexible seat interface 67 provides the entirety of the perimeter of the combined seat pan 66 and flexible seat interface 67. Continuing with the assembly, weld nuts 88 are seated within detents 86. In some embodiments, weld nuts 88 are fixed within detents 86 to restrict rotation of weld nuts 88 relative to seat pan 66. Seat foam 62 is then place atop the combination of seat pan 66 and flexible seat interface 67. Seat foam 62 is generally sized to extend thereover and have a perimeter that approximates the perimeter of flexible seat interface 67. Seat cover 60 is then placed over the combination of seat foam 62, seat pan 66, and flexible seat interface 67. An outer circumferential edge of seat cover 60 is wrapped under the outer periphery of flexible seat interface 67. Seat cover 60 is then sewn to flexible seat interface 67 by running a seam around the perimeter of flexible seat interface 67. In the illustrated example, the orientation of seat cover 60 and flexible seat interface 67 provides that each stitch causes a thread to pass through seat cover 60, through flexible seat interface 67 and again through seat cover 60. It should be appreciated that flexible seat interface 67 is made of a material that allows penetration by a needle and is strong enough to retain a thread therein. In this manner, seat pan 66 is able to provide a rigid support capable of supporting the rider and flexible seat interface 67 provides a flexible interface with seat cover 60 such that changing weight loads from a rider are less likely to cause undesired rippling and movement that would be more likely if seat cover 60 was directly coupled to seat pan 66. Furthermore, while flexible seat interface 67 allows deformation and relative movement between seat cover 60 and seat pan 66, flexible seat interface 67 is substantially resilient to allow the overall seating surface 50 to continually rebound to a desired shape during repeated loading and unloading.

It should be appreciated that the shape of seat pan 66 is generally determinative for the shape of seating surface 50 generally as seat cover 60, seat foam 62, and interface 67 are flexible. The shape of seat pan 66 provides that seating surface 50 includes a central portion 74, left and right lateral portions 76, 78, front portion 80, and rear portion 82. Central portion 74 is between and generally higher than left and right lateral portions 76, 78. Indeed, in the provided example, central portion 74 has a height that is greater than height at the left and right lateral portions by such a degree that the height difference between central and lateral portions is greater than a vertical height of cantilevered portion 94 of cantilevered seat mount 52.

Seat mount 52 is a rigid unitary homogeneous member constructed from forged aluminum. Seat mount 52 is unitary and homogeneous in that it is a single piece and is all constructed from the same material without welds. Seat mount 52 includes mount portion 92 and cantilevered portion 94. Mount portion 92 includes frame interface 96 that is a lower side thereof and illustratively presents a planar surface (non-continuous) that abuts frame 4. Mount portion 92 further includes coupler bores 98 (illustratively four coupler bores) suitable for receiving bolts or other couplers that fix seat mount 52 to frame 4 (see FIG. 6). Mount portion 92 also includes tongue receiver void 99 defined therein that is open in a rearward direction and sized and shaped to receive at least a portion of tongue 68 therein.

Cantilevered portion 94 includes a support ring 100 having a plurality of upper and lower ribs 102, 104, seating surface coupler voids 106, and accessory recess 108 having accessory voids 110. Support ring 100 of cantilevered portion 94 includes an outer periphery and an inner periphery defining void 112 therein. Upper and lower ribs 102, 104 extend rearward from mount portion 92 along upper and lower sides of support ring 100 to provide additional structural stability. Seating surface coupler voids 106 are located proximate the rear end of support ring 100. Voids 106 are spaced similarly to coupler voids 84 of seat pan 66 such that couplers extending through seating surface coupler voids 106 also extend through coupler voids 84 of seat pan 66 for threaded engagement of weld nuts 88.

Accessory recess 108 is a portion of support ring 100 located at the rear thereof having reduced thickness. Two accessory voids 110 are disposed within accessory recess 108 and are spaced apart by a distance that provides standard mounting possibilities for various accessories, such as seat backs, additional seats, saddle bags, etc. As will be discussed below, accessory recess 108 is able to cooperate with accessory mount 150 for the mounting of such accessories.

Battery cover 54 provides a cover for the battery that is typically located beneath the seat. With traditional seats, the seat is not cantilevered but rather in contact with the frame (or fairings) along its length and supported at both a front and rear end. Accordingly, the seat itself is often able to act as a battery cover or frame cover. Battery cover 54 is mounted at the rear to a rear wheel cover 120 via cover mount 56. Battery cover 54 is further disposed between seat mount 52 and frame 4 such that mounting of seat mount 52 to frame 4 also couples a forward end of battery cover 54 to frame 4.

In assembly, seat mount 52 is coupled to frame 4 (thereby coupling battery cover 54 to frame 4) prior to seating surface 50 being coupled to seat mount 52. With seat mount 52 coupled to frame 4, seating surface 50 is coupled to seat mount 52. Tongue 68 is aligned with tongue receiver void 99 and seating surface 50 is moved forward to cause tongue 68 to engage tongue receiver void 99, FIG. 7. Seating surface 50 is moved forward until coupler voids 84 align with seating surface coupler voids 106. Couplers (bolts) are then advanced through voids 106 and 84 to secure seating surface 50 to seat mount 52.

The embodiment of seat assembly 26 disclosed herein is able to withstand a 6G instantaneous load while supporting a 230 lb operator. The embodiment is further able to withstand a constant fatigue load with the same 230 lb. operator. In testing, when supporting the 230 lb. operator, the rear cantilevered end 34 of seat assembly 26 was found to deflect less than 2 mm relative to its unloaded state.

Figure 9:
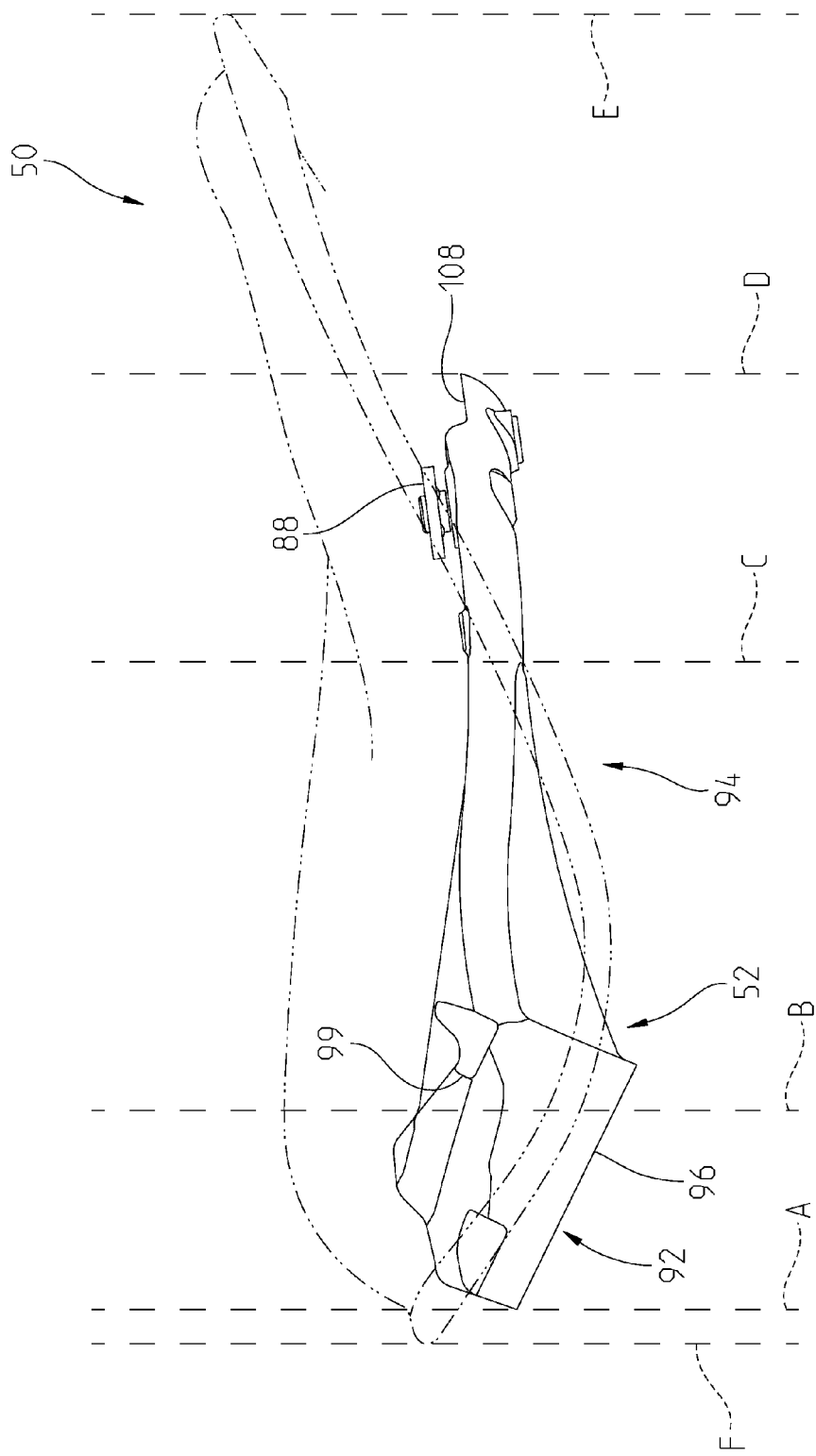
FIG. 9 is a plan view of the seat support of FIG. 4 along with the seating surface shown in phantom and various measurements thereof.

FIG. 9 shows the attitude of seat mount 52 and seating surface 50 (in phantom) in assembly. The side plan view of FIG. 9 shows that much of seat mount 52 is obscured from lateral view by seating surface 50. A portion of mount portion 92 extends forward of seating surface 50. However, this portion is obscured by other fairings and/or bodywork. Accordingly, from a plan view, seat mount 52 is only minimally perceptible via the rear portion of cantilevered portion 94.

It should be appreciated that the angled orientation of seat mount 52 gives an overall longitudinal length that is greater than the length that would be if frame interface 96 were sitting flush on a level surface. The overall longitudinal length is shown in FIG. 9 as the distance between lines A and D (the "A-D length"). In the illustrated embodiment, the A-D length is 10.00 inches. Similarly, the length of cantilevered portion 94 is shown by the B-D length of FIG. 9 that is 7.89 inches in the illustrated embodiment. Other distances of interest include the obscured length of seat mount 52 (A-C length) of 6.92 inches, the visible length of seat mount 52 (C-D length) of 3.08 inches (which is also the visible length of cantilevered portion 94), and the obscured (obscured by lateral left and right portions 76, 78) length of cantilevered portion 94 (B-C length) of 4.82 inches. These lengths provide that less than 31% of seat mount 52 is laterally visible (greater than 69% is obscured) and that approximately 39% of cantilevered portion 94 is laterally visible (approximately 61% is obscured). The "floating" effect is generally improved by a greater amount of seat mount 52 and cantilevered portion 94 being obscured. Accordingly, while embodiments are envisioned where 50% or greater of seat mount 52 and/or cantilevered portion 94 are obscured from lateral view, additional embodiments include those having greater than 60%, greater than 69%, greater than 75%, greater than 80%, greater than 90%, and even 100% of the length of seat mount 52 and/or cantilevered portion 94 is obscured from lateral view.

Similarly, the overall illustrated length of seating surface 50 (E-F length) is 14.2 inches long. Accordingly, the laterally exposed length of the cantilevered portion 94 (and of the seat mount 52) is 3.08 inches of 14.2 inches, which is just under 21.7%. Accordingly, while embodiments are envisioned where 30% or less of cantilevered seating surface 50 have a laterally viewable support structure, additional embodiments include those having less than 25%, less than 22%, less than 20%, less than 15%, less than 10%, and even 0% of the length of seating surface has a laterally viewable support structure.

Figure 6:
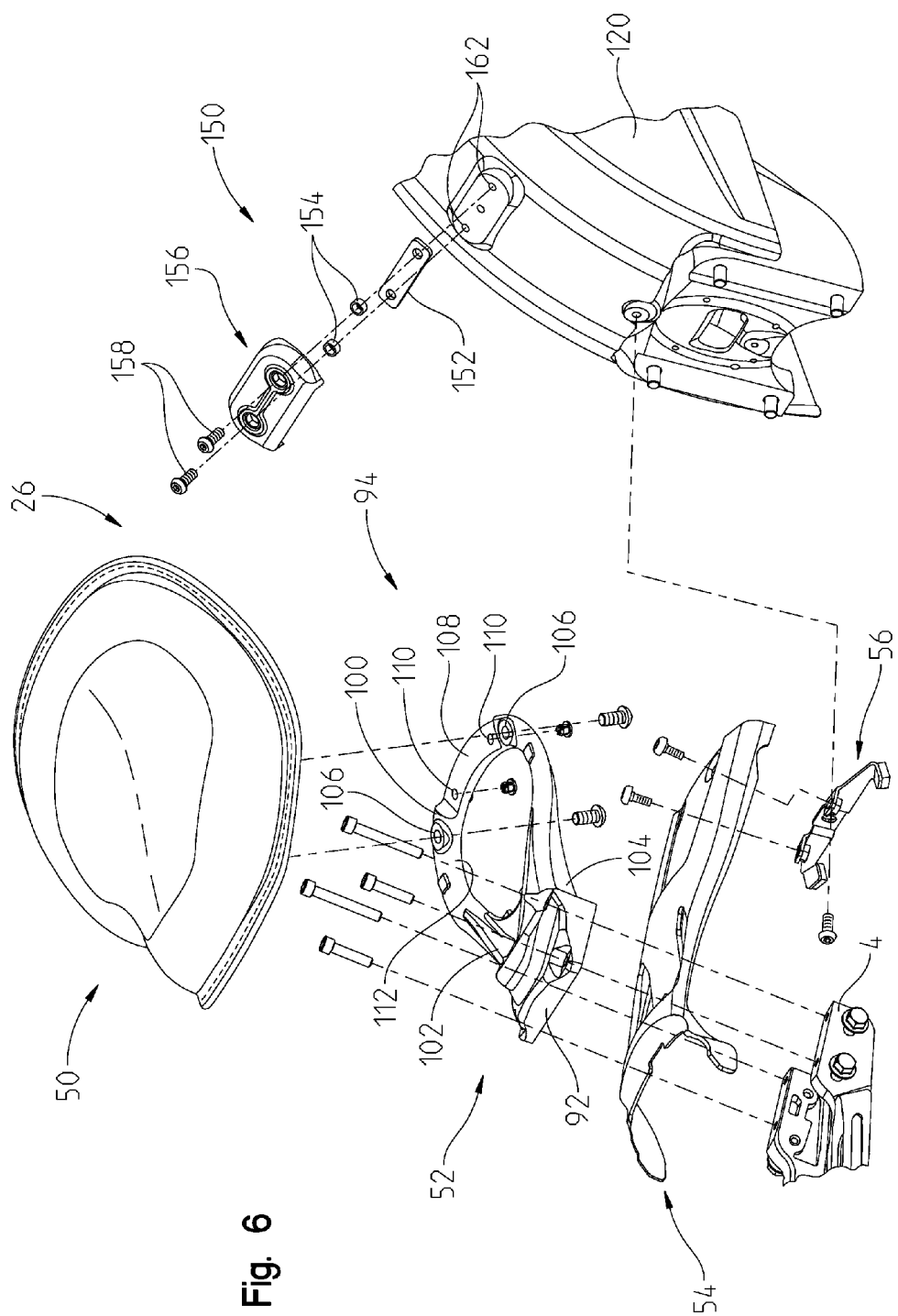
FIG. 6 is an exploded view of the seat, frame, and rear accessory mount of the vehicle of FIG. 1.
Figure 7:
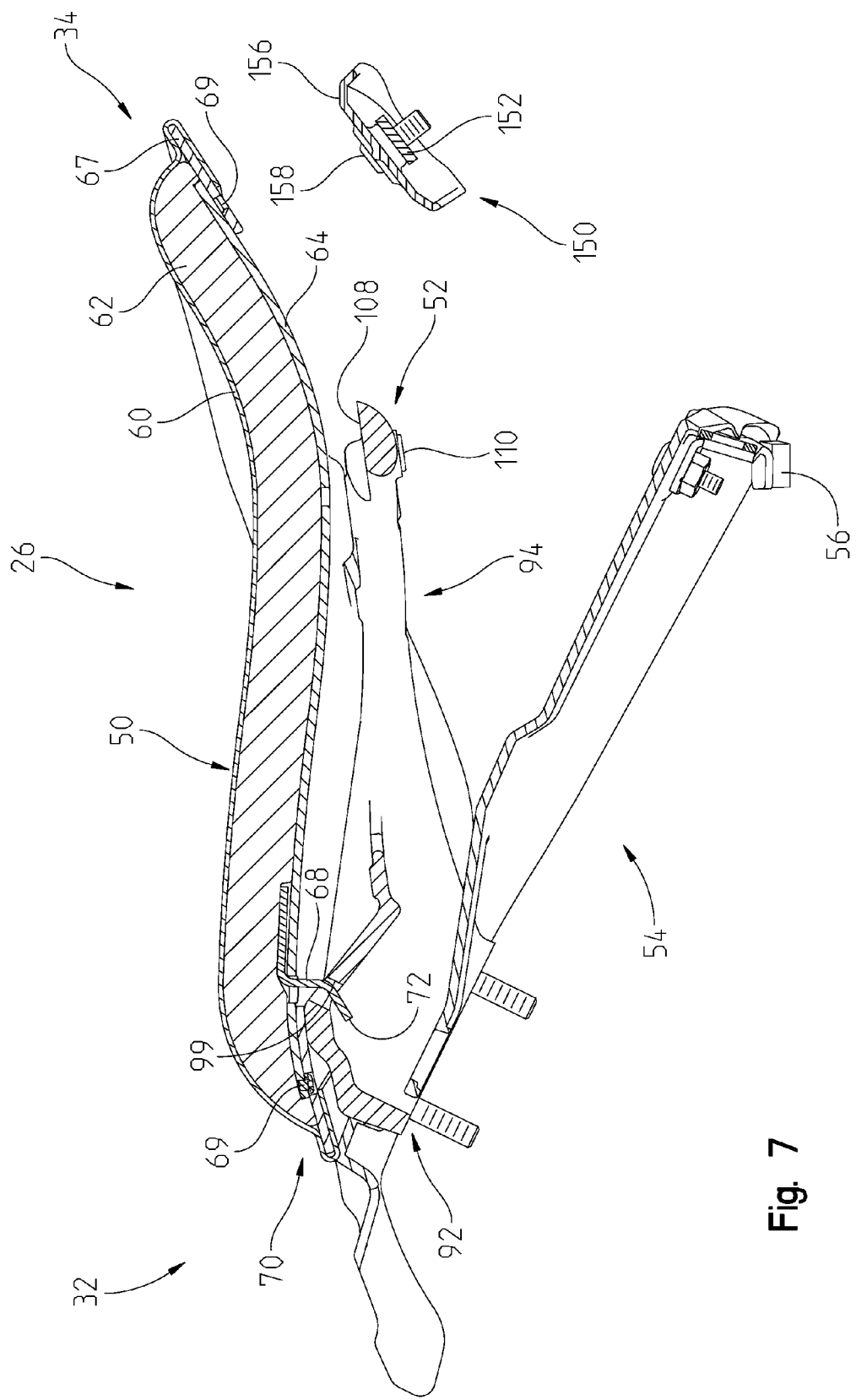
FIG. 7 is a cross-sectional view of the assembled seat, seat support, and accessory mount of FIG. 4.
Figure 8:
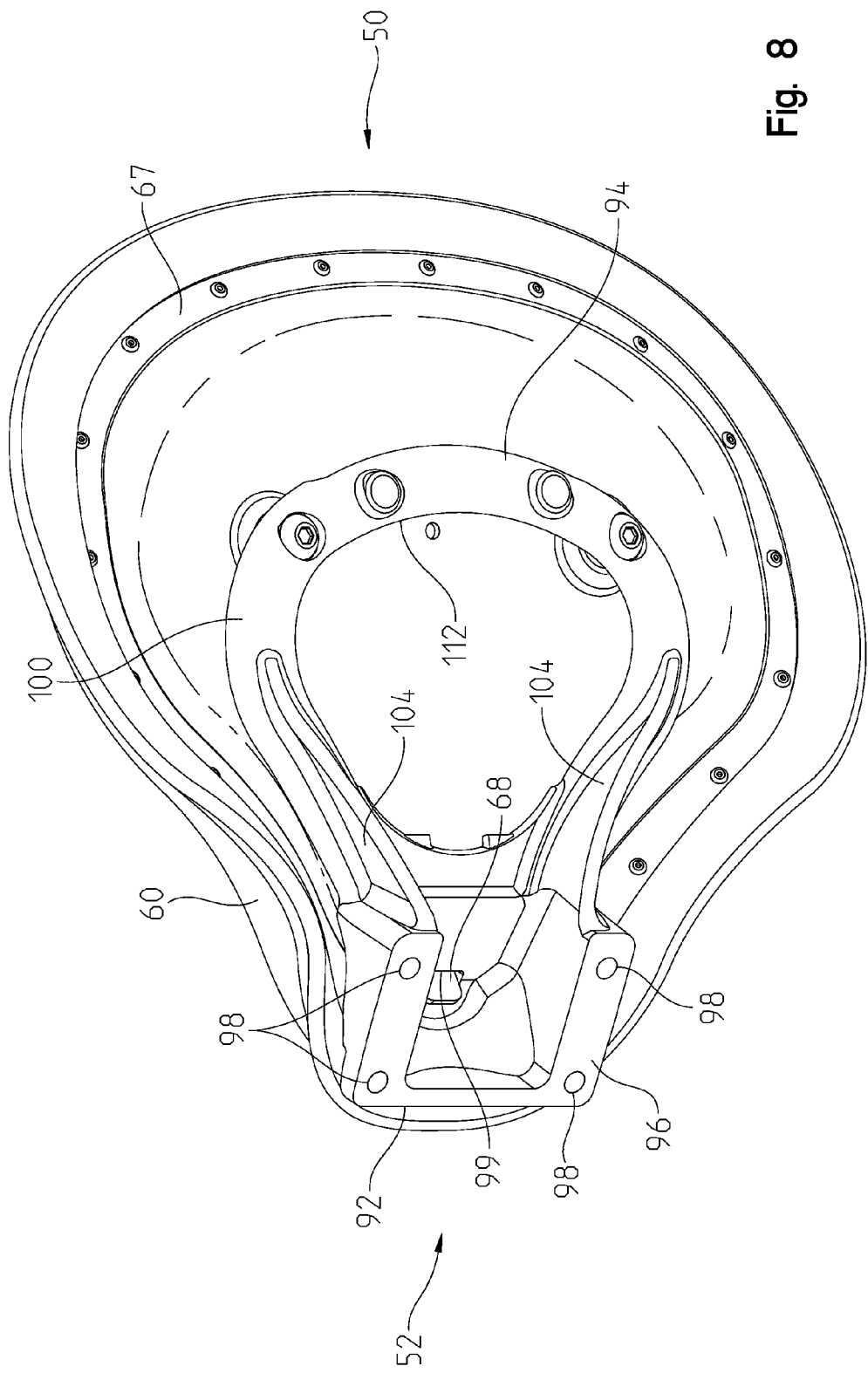
FIG. 8 is a lower perspective view of the assembled seat and seat support of FIG. 4.
Figure 10:
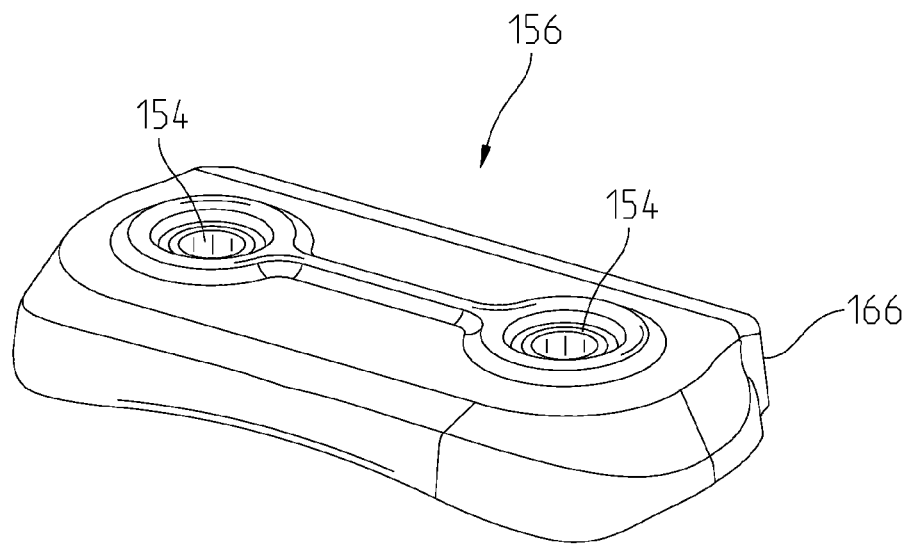
FIGS. 10-11 are perspective views of the accessory mount cover.
Figure 11:
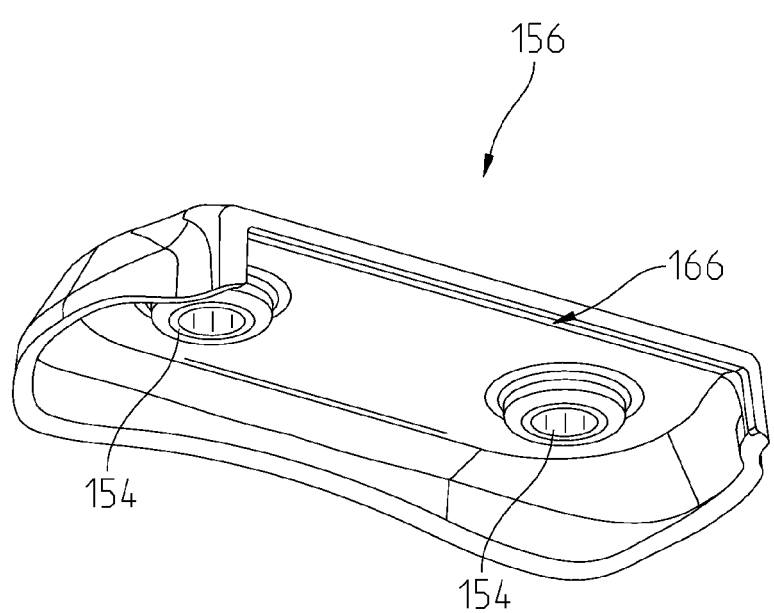

A forward-facing side of rear wheel cover 120 includes accessory mount 150, FIG. 6. Accessory mount 150 includes threaded voids 162, mount plate 152, spacers 154, mount cover 156, and couplers (bolts) 158. Threaded voids 162 are disposed in a portion of the vehicle frame 4 that extends through a void in wheel cover 120. FIGS. 10 and 11 show perspective views of accessory mount cover of accessory mount 150. It should be appreciated that one side 166 of mount cover 156 is open while the opposing side 168 is closed. Mount cover 156 is a reversible member. Mount cover 156 is mounted (by passing couplers 158 through recesses 164, spacers 154, mount plate 152 and threadingly engaging with threaded voids 162) having open side 166 on the lower side when no accessory is intended to be mounted on accessory mount 150, FIG. 4. Mount cover 156 thus provides a closed upper side that deters foreign matter from above and presents a closed look from above (the predominant view from which it will be viewed). When an accessory is to be attached to accessory mount 150, mount cover 156 is removed, rotated 180-degrees, and then re-attached once the desired accessory is also attached (such as via couplers 158). The accessories are expected to mount above and rearward of accessory mount 150. Accordingly, having open side 166 facing upwards allows a portion of the accessory (not shown) to extend upwards and rearwards of accessory mount 150 while having clearance of the attached mount cover 156.

What is claimed is:

1. A seat assembly coupled to a motorcycle frame, including:
   a seat support pan defining a first perimeter;
   a flexible member coupled to a first side of the seat support pan and having a second perimeter such that all portions of the first perimeter are within the second perimeter, and wherein at least portions of the second perimeter extend radially beyond the first perimeter; and
   a seat cover including at least one of fabric and a skin positioned over a second and opposite side of the seat support pan and coupled to the flexible member only to the portions of the second perimeter which extend radially beyond the first perimeter.

2. The seat assembly of claim 1, wherein the seat cover is sewn to the flexible member.

3. The seat assembly of claim 1, wherein the seat support pan is constructed from metal.

4. The seat assembly of claim 1, wherein the flexible member is riveted to the seat support pan.

5. The seat assembly of claim 1, wherein the seat support pan includes a mount that provides for coupling the seat assembly to the motorcycle frame.

6. The seat assembly of claim 1, wherein the flexible member is a ring of flexible material having a hardness that permits intrusion by a needle.

7. The seat assembly of claim 1, wherein the perimeter of the flexible member extends radially beyond all portions of the perimeter of seat support pan.

8. The seat assembly of claim 1, wherein the flexible member is positioned on a lower side of seat support pan and the seat cover is positioned on an upper side of seat support pan.

9. A method of mounting a seating surface element to a support structure including:
   obtaining the support structure, the support structure having a weight capacity to support a human seated thereon, the support structure having a first perimeter;
   obtaining the seating surface element including at least one of fabric and a skin;
   obtaining a flexible member having a second perimeter larger than the first perimeter;
   coupling the flexible member to the support structure such that the second perimeter encompasses the first perimeter wherein at least portions of the second perimeter extend radially beyond the first perimeter; and
   coupling the seating surface element to the flexible member only to the portions of the second perimeter which extend radially beyond the first perimeter.

10. The method of claim 9, wherein coupling the seating surface element to the flexible member provides that all upward and laterally outward sides of the coupled seating support structure and flexible member are covered by the seating surface element.

11. The seat assembly of claim 9, wherein the perimeter of the flexible member extends radially beyond all portions of the perimeter of seat support pan.

12. The seat assembly of claim 9, wherein the flexible member is positioned on a lower side of seat support pan and the seat cover is positioned on an upper side of seat support pan.

* * * * *